United States Patent [19]

Poole

[11] Patent Number: 5,321,930
[45] Date of Patent: Jun. 21, 1994

[54] DIE FOR MANUFACTURING A SHELF-STABLE CABLE TOP CARTON

[75] Inventor: Donald A. Poole, Greenfield Park, Canada

[73] Assignee: FBI Brands Ltd., Mt. St. Hilaire, Canada

[21] Appl. No.: 76,669

[22] Filed: Jun. 15, 1993

Related U.S. Application Data

[60] Division of Ser. No. 395,585, Aug. 18, 1989, Pat. No. 5,242,701, which is a continuation-in-part of Ser. No. 261,325, Oct. 24, 1988, Pat. No. 4,946,041, and a continuation-in-part of Ser. No. 261,392, Oct. 24, 1988, abandoned.

[51] Int. Cl.$^5$ .................. B65B 51/14; B65B 61/18
[52] U.S. Cl. .................. 53/371.2; 53/374.2; 53/133.3
[58] Field of Search ............ 53/374.2, 133.4, 479, 53/371.2, 412, 370.9, 565, 133.3; 156/583.4

[56] References Cited

U.S. PATENT DOCUMENTS

| | | |
|---|---|---|
| 3,200,557 | 8/1965 | Schwenk . |
| 3,220,161 | 11/1965 | Lohse et al. . |
| 3,370,399 | 2/1968 | Egleson . |
| 3,392,458 | 7/1978 | Braun . |
| 3,468,731 | 9/1969 | Obeda .................. 53/374.2 X |
| 3,488,244 | 1/1970 | Lepisto . |
| 3,765,144 | 10/1970 | Schlesser . |
| 3,825,408 | 7/1974 | Farfaglia et al. . |
| 3,889,449 | 6/1975 | Membrino . |
| 3,938,931 | 2/1976 | Emmel .................. 156/583.4 X |
| 3,956,046 | 5/1976 | Tsuchiya et al. . |
| 3,956,975 | 5/1976 | Egleston et al. . |
| 4,078,364 | 3/1978 | Schmidt . |
| 4,079,570 | 3/1978 | Rucker . |
| 4,159,220 | 6/1979 | Bosche et al. .................. 53/374.2 X |
| 4,403,465 | 9/1983 | Bachner .................. 53/370.9 X |
| 4,437,293 | 3/1984 | Sanborn, Jr. .................. 53/133.4 X |
| 4,518,377 | 5/1985 | Skinner . |
| 4,709,533 | 12/1987 | Ausnit .................. 53/133.4 X |
| 4,712,727 | 12/1987 | Wyberg . |
| 4,807,426 | 2/1989 | Smith .................. 53/374.2 X |
| 4,927,474 | 5/1990 | Pawloski .................. 156/583.4 X |

FOREIGN PATENT DOCUMENTS

| | | |
|---|---|---|
| 0094888 | 11/1983 | European Pat. Off. . |
| 0203572 | 3/1986 | European Pat. Off. . |
| 0331792 | 9/1989 | European Pat. Off. . |

Primary Examiner—Horace M. Culver
Attorney, Agent, or Firm—Kenyon & Kenyon

[57] ABSTRACT

Several embodiments of a die for heat sealing a heat sealable carton having a gable shaped closure are disclosed. Each embodiment of the die includes a pair of opposed jaws. Each of the jaws has portions for providing a firm seal capable of keeping bacteria out of the carton, and other portions for selectively sealing non-critical areas of the carton to a lesser extent to make the carton easy to open. The lightly sealed areas are caused by a recessed area in at least one jaw; a protrusion associated with a recessed area provides a highly staked seal area. A method of packaging in gable top cartons is also disclosed.

18 Claims, 5 Drawing Sheets

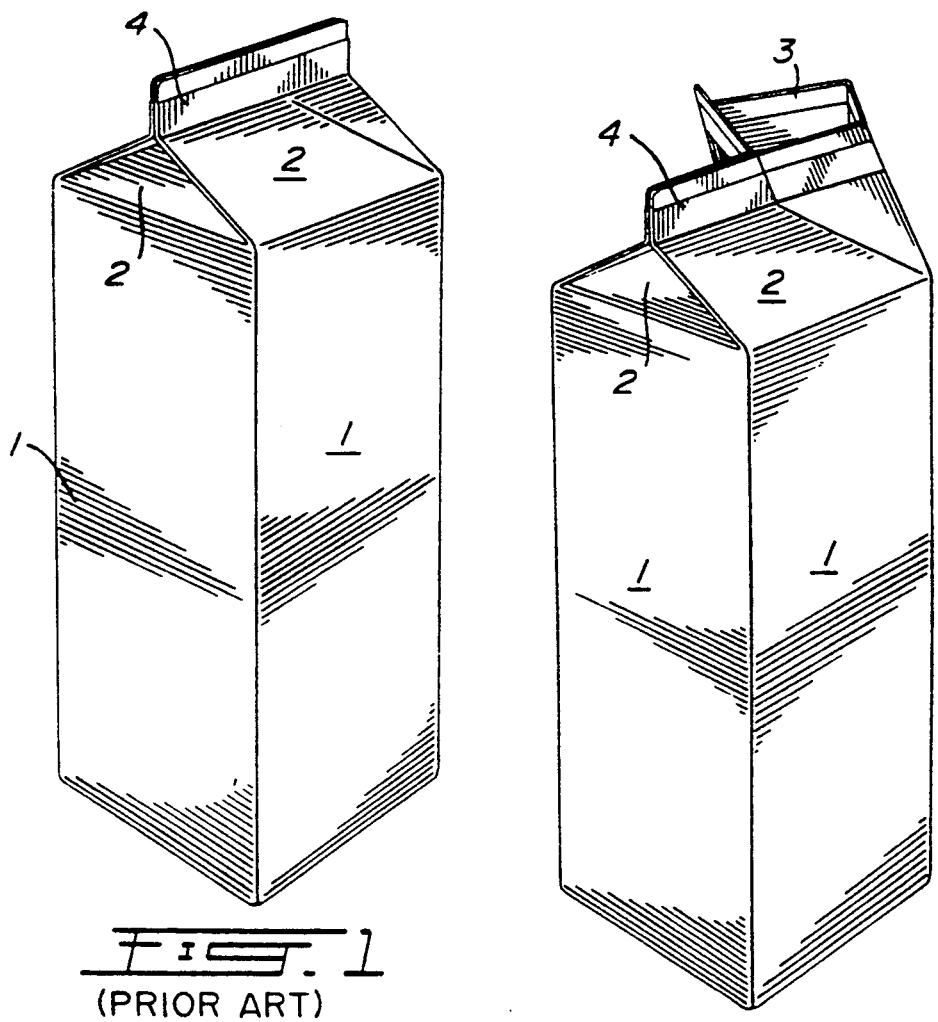
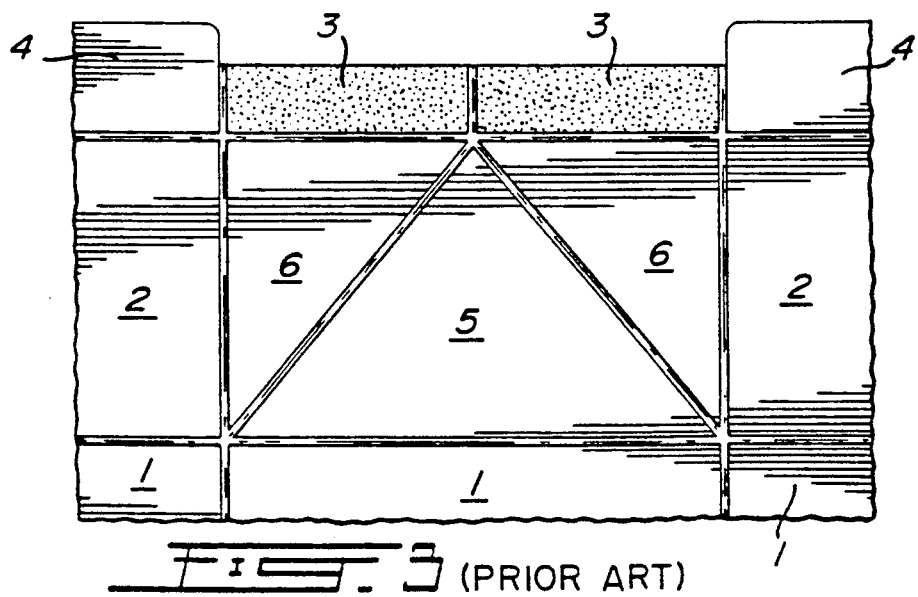

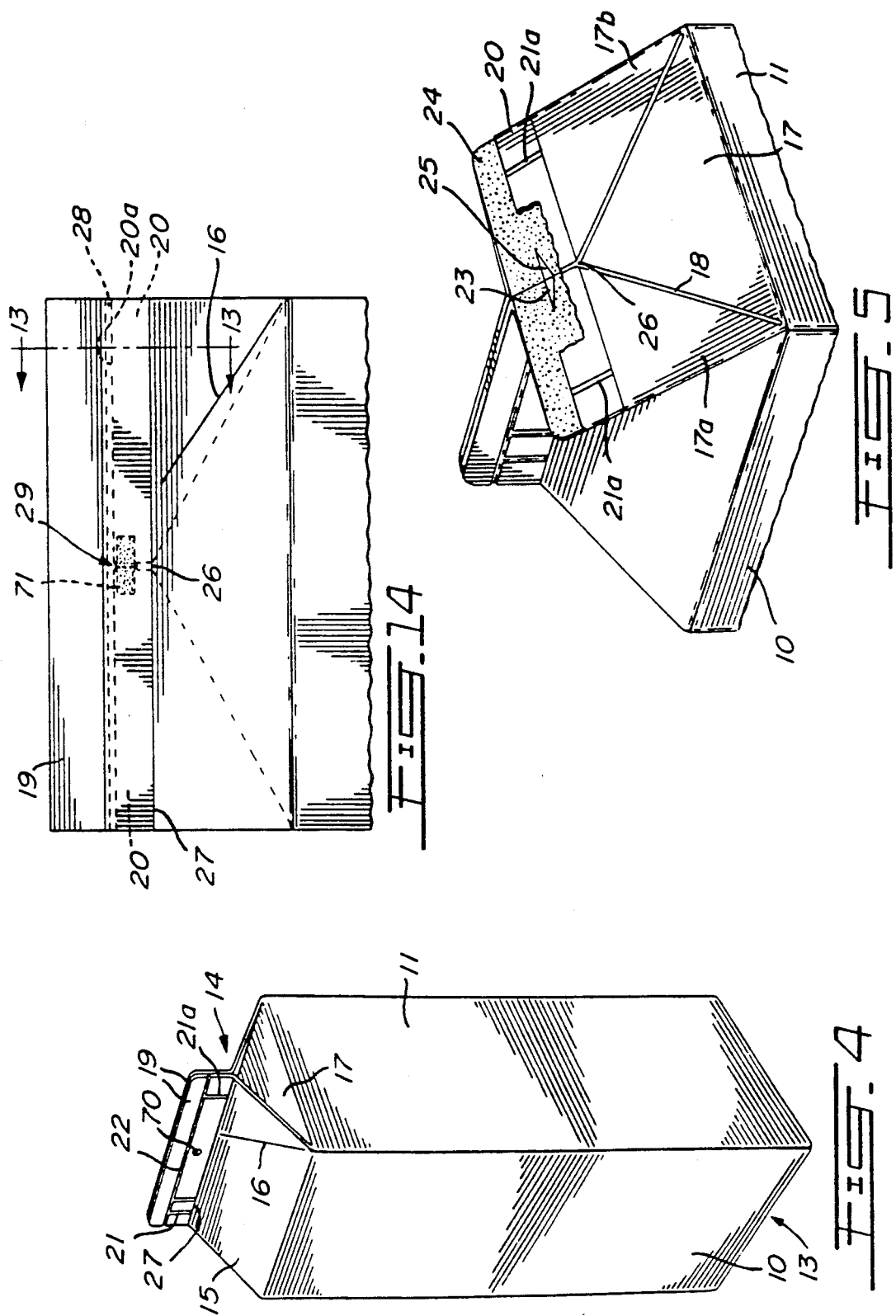

DIE FOR MANUFACTURING A SHELF-STABLE CABLE TOP CARTON

This application is a division of application Ser. No. 07/395,585 filed on Aug. 8, 1989, (now U.S. Pat. No. 5,242,701) which was a continuation-in-part of application Ser. Nos. 07/261,325 (now U.S. Pat. No. 4,946,041) and 07/261,392, now abandoned, both of which were filed on Oct. 24, 1988.

FIELD OF THE INVENTION

This invention relates to the shelf stable packaging of perishable juices and other perishable liquid products in hermetically sealed gable top cartons acceptable to the consumer. A packaged product is said to be shelf stable when it retains its desirable qualities for an extended period of time without refrigeration.

BACKGROUND OF THE INVENTION

The selection of appropriate containers and processes for packaging a particular liquid food product presents the packer with various options from which to choose. Against these must be considered numerous factors. These include cost of the container and packaging process, structural integrity and weight of the package, handling convenience for the packer and convenience for the consumer i.e., can the container be tightly packed? Is it fragile? The packer must also consider the distribution network and infrastructure available in the market sought to be served: is refrigeration available, if not, the packaged product must be rendered shelf stable?

A package which is too costly in relation to the value of the product itself or which is inconvenient in some respect for the consumer will meet with market resistance and likely fail to win a sufficient degree of acceptance to be commercially viable.

Traditionally juices have been packed in cans and glass bottles. The technology applicable to these packages is well known. Juices packed in these containers may be kept unrefrigerated for extended periods provided that these products and their containers have been sterilized and hermetically sealed in order to prevent entry of bacteria.

These containers have achieved wide acceptance through use. They may be easily sterilized and sealed effectively. They tolerate both internal vacuum and positive pressure. Closures such as twist off lids for bottles are acceptable to consumers because they are easy to operate and may be used to close the bottles effectively after first opening. These containers resist high temperatures and thus may be sterilized at usual temperatures without deteriorating their structural qualities.

Among the disadvantages of glass bottles and cans are cost and the weight which they add to the product. Also, because of their shape, cans and bottles cannot be tightly packed. In the case of bottles their relative fragility is also a disadvantage.

More recently greater use of so-called flexible containers has been made for the packaging of liquid food products. These include paper-based containers, molded plastic containers and plastic pouches.

Two types of paper-based flexible containers have become widely accepted, the gable top carton and the brick pack. The gable top carton has been extensively used for packaging refrigerated non-shelf stable liquid products such as milk and other dairy products and fruit juice products. The brick pack, so called because of its shape, has been extensively used in association with an aseptic packing process for fruit juices packaged for shelf stability and which therefore do not require refrigeration.

The gable top carton is relatively inexpensive and light weight. Moreover, because of its planar sides it can be tightly packed for shipping and storage. The gable top carton enjoys wide acceptance in the public for its ease of storage and handling after opening and for its spout which pours well and re-closes effectively even to the extent of permitting the contents to be lightly shaken without spilling. One disadvantage of the gable top carton, when compared with glass bottles, is the difficulty encountered by many consumers in opening the carton for the first time. This problem has been largely overcome in the dairy and fruit juice industry by simply weakening the seal at the spout.

A previously proposed method of weakening the spout is described in U.S. Pat. No. 3,116,002, wherein it is suggested that a non-adherent material "abhesive" be applied to selected areas near the spout in order to reduce the plastic-to-plastic bond formed during the sealing process. This method adds to the cost of the carton and quality control as the precise placement of the abhesive is difficult to achieve during packing.

While the otherwise desirable goal of achieving a strong hermetic seal is defeated the consumer has become accustomed to the fact that dairy products and juices packed in this way must be kept refrigerated and have only limited shelf lives. Because of this practice of weakening the seal to please the consumer, from a consumer acceptance point of view, it is not possible to successfully market a juice in a gable top carton unless The spout is relatively easy to open.

Unfortunately, in some ways the gable top carton lacks the structural integrity of other containers, especially cans. For instance, gable top cartons are relatively intolerant of internal vacuum or pressure. Also their physical properties make them less tolerant of high sterilization temperatures. As discussed below, these drawbacks have inhibited use of gable top cartons in shelf stable packaging.

Typically, gable top cartons are formed of paperboard sheet material having an overall coating of thermoplastic film such as polyethylene applied on the surfaces of the sheet. The plastic coated paperboard is impervious to moisture and is particularly suitable for use in packaging products such as milk and orange juice. The thermoplastic coating not only serves to moisture proof the carton but also can be utilized for sealing the carton closing flaps which characterize the gable top carton. This sealing action accomplished by heating the surfaces to be sealed while pressing them tightly together to form a liquid tight plastic-to-plastic bond.

The carton erected from the plastic-coated blank typically includes a bottom, four sidewalls extending from the bottom and united along their lateral margins, and an upper closure means which can be opened to form a spout. The closure is formed from four end wall portions united with the sidewalls and with each other at the lateral margins; the end wall portions are inclined in pairs toward each other and have marginal portions heat sealed to each other which form extensions of the end wall portions; the marginal portions of two opposite end wall portions are folded like bellows between the outer marginal portions of the two remaining end wall portions and at least one of the two inwardly folded marginal portions is moveable outward together with the pertaining end wall portions from its position between the two outer marginal portions to a new position outside these where the marginal portion after being moved outward, as well as its pertaining end wall portion, form a pouring spout and an emptying passage.

Traditionally, dairy products and fruit juices packed in gable top cartons have been kept refrigerated throughout the distribution process in order to avoid almost immediate spoilage. This spoilage would result from the fact that the gable top cartons are not sterilized and that bacteria in the environment and on the inside of the carton itself would develop very quickly. It is only refrigeration which retards spoilage for up to a couple of weeks. Products packed in this way are not said to be shelf stable.

Shelf stability is extremely desirable from many standpoints. A shelf stable product is much less likely to spoil while in the distribution system and with a shelf life measured in months rather than days losses due to spoilage should be low. The packer does not need to maintain the product under refrigeration either in its warehouse or while in transport. Similarly the retailer need not allocate expensive refrigerated space to store its supply of product. The consumer also has the advantage of a product which does not require refrigeration until opened.

Shelf stability may only be achieved in two ways. First, use may be made of chemical preservatives. Alternatively, precautions must be taken to exclude the possibility of bacteria coming into contact with the product following pasteurization of the product itself.

In order to achieve shelf stability of a juice or similar liquid food product without using chemical preservatives the product must be sterilized (said to be pasteurized). Following pasteurization no bacteria must be permitted to come into contact with the product. To ensure that this is the case, all bacteria which may come into contact with the product prior to or at the time of filling and sealing of the carton, all bacteria within the carton and all bacteria in the environment which become trapped in the carton after sealing must be killed. Failure to do so will inevitably lead to spoilage.

With glass containers and cans a process known as post packaging sterilization has been employed to achieve shelf stability. The liquid is poured into a non-sterile container, the container is capped and sealed; the container and its contents are heated to and maintained at a sterilization temperature until all the bacteria within the container are killed; the container is then cooled; the product is then shelf stable.

This process has been used in the brewing and soft drink trade in packaging liquids in bottles and cans. It has also been used to package liquids in flexible containers. For example, U.S. Pat. Nos. 4,088,444 to Byrne and 2,995,418 to Muller each disclose a sterilization process wherein a container formed from flexible material such as plastic is filled with a liquid, sealed, and sterilized by first subjecting the container to a hot liquid bath or to steam until the temperature of the liquid in the containers reaches the sterilization temperature, maintaining the temperature at the sterilization temperature until sterilization is effected, and thereafter cooling the liquid in the containers by subjecting the containers to cold water. Muller in particular specifically contemplates sterilizing fruit juices which are in sealed plastic containers.

U.S. Pat. No. 4,376,126 to Evers discloses a method of making a yogurt beverage which includes the steps of pasteurization or sterilization after the beverage has been packed in a container. Evers, however, does not appear to specifically disclose the use of any particular container nor does he mention the special problems associated with gable top cartons.

U.S. Pat. Nos. 4,057,391 to Yamaguchi, 3,481,688 to Craig et al. and 2,380,134 to Waters disclose methods of preserving or sterilizing food in flexible containers, such as plastic containers, whereby the food is subjected to heating and then cooling after being sealed in the containers. However, these patents do not specifically teach the sterilization of liquid food products, such as fruit juices nor do they address the special problems associated with gable top cartons.

U.S. Pat. No. 237,449 to Schaumberg et al. discloses a method of preserving fruit juices in glass bottles that includes bottling and sealing the juices and thereafter heating the juices to 170° F. for 35 minutes. However, Schaumberg et al. does not disclose subjecting the heated bottles to a cooling process and does not contemplate the use of plastic or plastic coated cartons nor does he address the special problems of gable cartons.

Despite the wide recognition of the usefulness of most package sterilization in other packaging systems, the process has not to the inventor's knowledge previously been used to package perishable liquids in gable top cartons.

Since the introduction in the 1950's of paper-based cartons for liquid food products, only two processes have been widely promoted in order to permit paper-based cartons to be used for packaging shelf stable products. These are the aseptic process, promoted since the early 1960's by Tetra Pak of Sweden principally in association with the so-called brick pack, and the hot fill process more recently adapted for gable top cartons from a process used in connection with glass bottles.

In accordance with the aseptic process the product is pasteurized and kept in a sterile environment up to and through the filling and sealing of the container which is pre-sterilized (generally using hydrogen peroxide and steam) and also kept in a sterile environment until filling and sealing. The seal must be hermetic under all conditions. Aseptically processed brick packs must be cut, pierced or torn to open. In each case either the opening or the re-closing is clumsy and is not considered advantageous from a consumer convenience point of view. The a septic method is complicated to carry out and requires specialized and expensive equipment.

Notwithstanding the complexity and cost of the aseptic process it became widely accepted in Europe, Australia and Canada in the 1970's. It was only approved in the United States in the early 1980's and has become widely accepted since that time. Prior to the introduction of the aseptic process and the brick pack there were no shelf stable products packaged in paper-based containers. The aseptically packed brick pack created a whole new application for paper-based containers. The success of the aseptically packed brick pack has been nothing short of phenomenal. It is estimated that, on a worldwide basis, aseptically packed brick packs account for over $20 billion dollars worth of liquid food products.

Because of the complexity and cost of the aseptic process, efforts were made to achieve shelf stability in paper-based containers, most desirably with the popular gable top carton, with simpler less expensive technology. In the early 1980's a so called hot fill process was proposed.

A less costly alternative to the aseptic method, the hot fill method did not meet with much success. In accordance with the hot fill method the pasteurized product is heated to temperatures in the range of 185 degrees F. and poured hot directly into the gable top carton which is then sealed. The heat of the product itself kills the bacteria remaining within the container after sealing.

In the United States the hot fill method for gable cartons was adopted by various juice packers but has largely been abandoned because this method results in a substantial vacuum being created within the container following the cooling of the product from the hot fill temperature to room temperature. This vacuum is undesirable because it promotes the inflow of bacteria from the environment through the seal which leads to quick spoilage unless the product is refrigerated. In order to deal with this problem the seal must be strong enough to withstand the significant pressure differential created by the process. The seal must also be strong enough to retain its integrity in all cases throughout the distribution process. If at any time seal integrity is lost, the vacuum will cause bacteria to enter the carton and virtually immediate spoilage to occur.

Where the seal was made sufficiently strong to prevent the entry of bacteria under all conditions, the cartons were so hard to open that consumers, used to the ease of opening of the weakly sealed gable cartons used for dairy products, resisted the container.

In practice, the strength of the seal which had to be provided to overcome the problems created by the high vacuum resulted in a significant percentage of the cartons not being readily openable by the consumer in the ordinary way. This was such a problem that International Paper, the principal proponent of the hot fill technology, developed an alternative form of opening the carton, subject of U.S. Pat. No. 4,527,732 issued in 1985, which covers a scored "smile" to be pushed through by the consumer.

Thus up until the present invention industry efforts to adapt the popular gable top carton to achieve shelf stability and yet retain its good opening and handling qualities all at reasonable cost have heretofore not proven successful; and this despite the fact that finding an uncomplicated and inexpensive method of achieving shelf stability with a gable top carton would open up a market worth at least several hundred million dollars for cartons alone.

Thus, there remains a need for a system for shelf stable packaging of perishable liquids which allows use of a gable top carton which can be hermetically sealed to ensure shelf stability while retaining an easily opened spout necessary for consumer acceptance.

SUMMARY OF THE INVENTION

The present invention overcomes the difficulties referred to above in adapting the gable top carton for the packaging of shelf stable liquid products such as juices in a manner acceptable to the consumer. The present invention is, to some extent, the consequence of the present inventor's recognition of a significant interrelationship between the strength of seal necessary to maintain hermeticity and the process used to sterilize the gable top carton.

Having recognized this, the present inventor has determined that the lack of commercially viable system for shelf stable packaging in gable top cartons is primarily due to a failure to find an acceptable compromise between hermetically sealing and ease of opening of the sealed spout of the gable top carton. These two objectives are diametrically opposed; the stronger the seal, the harder it is to open and the lesser the consumer acceptance.

The present inventor has discovered that shelf stability with an easy to open gable top carton can be achieved through the selection of an appropriate post-pasturization process combined with an appropriate seal design. The inventor has also discovered that an adequate seal which is still easy to open can be achieved by applying increased pressure at certain empirically located critical points along the seal. If these critical points are adequately sealed, the remainder of the seal can be sealed in an easy open fashion. Consequently, the spout is still easy to open.

In summary, the inventor has discovered a technique for achieving the shelf stable packaging of perishable liquids in a gable top carton which is easy to open. The technique involves the combination of a technique for sealing a liquid in a gable top carton and a process for sterilizing the interior and contents of the sealed carton.

In accordance with the present invention, the liquid food product to be packed is first pasteurized, if required, in accordance with procedures appropriate to the particular product. The product is then cooled to room temperature and introduced into gable top cartons which are then satisfactorily hermetically sealed at the empirically determined critical points along the sealing portion of the gable top carton in accordance with the method described below in such a way as to permit their ease of opening for the consumer. The filling process is open to the environment.

The sealed cartons are then heated to and held for an appropriate time at a post-pasteurization temperature appropriate to kill the environmental bacteria, mold and yeast remaining within the product and within the carton but at a temperature below that which would melt the inner plastic layer of the carton or cause delamination of the carton. Generally a post-pasteurization temperature in the range of about 160° F. is appropriate with a preferred temperature of about 167° F. with a holding time of about 10 minutes. The cartons are then cooled. Because the contents were originally sealed in the carton at room temperature and returns to room temperature after being heated, no vacuum is created (i.e. no pressure differential across the seal) and thus there is no danger that environmental bacteria will be drawn into the carton in the event the integrity of the seal is subsequently lost. While the seal is hermetic, it need not be as strong as that required if the hot fill process were used and is therefore more acceptable to the consumer because the carton remains easy to open. The present invention offers significant advantages over the hot fill method. With the present invention the desirable easy opening characteristics of the gable top carton may be retained which is not possible with the hot fill method because the seal must be very strong in order to overcome the pressure differential across the seal created by that process. In the event that seal integrity is lost or a leak occurs in a container packed by the hot fill method, the internal vacuum will immediately draw harmful microorganisms into the container which will lead to spoilage. With the present invention, because there is no vacuum in the head space above the liquid in the carton, a minor break in the seal or leak elsewhere will not result in microorganisms being drawn into the carton and thus spoilage will be avoided.

As compared with the aseptic process, the present invention requires much less sophisticated equipment which is both less costly and easier to operate. It is estimated that, taking into account capital costs and operating costs, the present invention can be worked for approximately 50% of the cost of the aseptic process in operations of a certain size. The present invention is also more secure than the aseptic process. Packing in the aseptic process must be done in an entirely aseptic environment. If, because of equipment or operator problems, any bacteria should find their way into the product or the container after they have been separately sterilized and before the package is sealed, then spoilage will occur. The present invention permits the filling to be done in an open environment because the bacteria are killed after the package is sealed and no further opportunity for bacteria to enter the carton occurs.

Another advantage of the present invention over the aseptic process is that the present invention does not require a sterilizing agent such as hydrogen peroxide. With the aseptic process it is always possible that traces of hydrogen peroxide remain on the inside surface of the container and contaminate the product. The use of hydrogen peroxide also presents a problem for workers packing the product. If for any reason the ventilation system required to evacuate hydrogen peroxide vapours should not operate properly, the atmosphere in the packing area may very quickly become contaminated and pose a health hazard to the workers. The present invention presents no such danger.

BRIEF DESCRIPTION OF THE DRAWINGS

FIG. 1 is a perspective view of a conventional gable top carton having an arrangement in a closed state;

FIG. 2 is a perspective view of the package of FIG. 1 in an open state;

FIG. 3 shows part of a blank for making a gable top carton;

FIG. 4 is a perspective view of a gable top carton according to the present invention;

FIG. 5 shows the carton of FIG. 4 partially opened;

FIG. 14 is a side view of the top of a gable top carton.

DETAILED DESCRIPTION OF THE INVENTION

Figure 6:
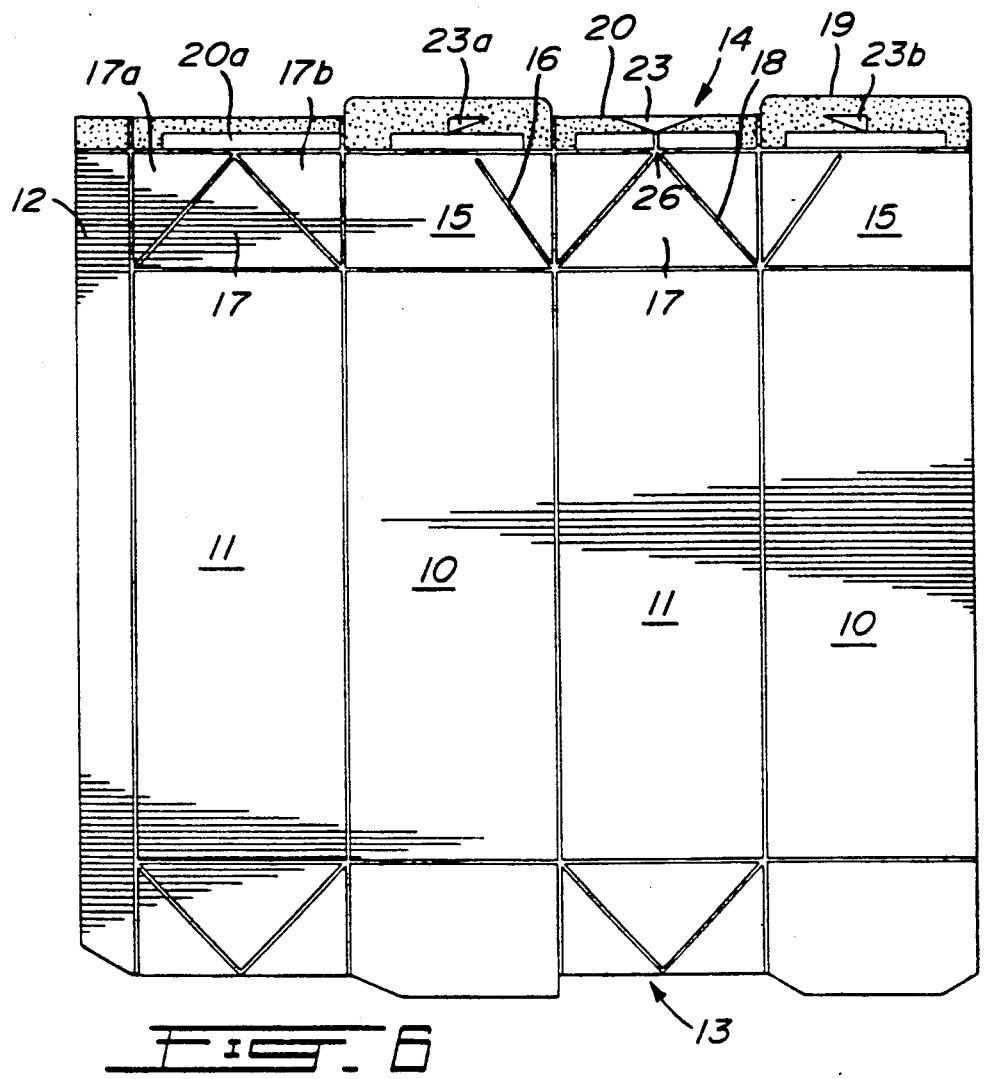
FIG. 6 shows the carton of FIGS. 4 and 5 opened up to show the heat sealed areas.

FIGS. 1–3 show a conventional gable top carton construction.

The package shown in the drawings has four sidewalls 1 and a bottom (not shown). Furthermore, the package has four end wall portions 2 which are united on one hand with the sidewalls 1 and on the other with each other. At the upper free margin, and end wall portions 2 are provided with marginal portions 3 and 4 which are folded toward each other in such a way that opposite end wall portions 2 are inclined in pairs toward each other and that the marginal portions 3 of two opposite end wall portions lie folded like bellows between the marginal portions 4 of the two remaining end wall portions. Thus, the end wall portions 2 which are provided with the inwardly folded marginal portions 3, will, as shown in FIG. 3, be divided into three essentially triangular portions, the intermediate one 5 of which extends between the end wall portions 2 provided with the outer marginal portions 4, while the two side portions 6 rest against the inside of each of each one of these.

The gable top carton is constructed from sheets of material which include at least a basic outer layer of cardboard and an inner layer of thermoplastic material. Normally, the sheet is entirely plastic coated and can include additional barrier layers. The preferred structural material of the present invention is in five layers, namely, an inner coating of polyethylene and aluminum (or other satisfactory barrier material) barrier, another polymeric layer to bond the foil, a layer of paper board and an outer layer of polyethylene or lacquer. A sixth layer, usual for hot filling methods, is not needed with the present invention. Suitable plastics for the carton also include vinyl resins, such as polyvinyl chloride, regenerated cellulose, polypropylene, polyethylene terephalate, polycarbonates and other plastics that are used for food products. Where a barrier layer is to be used, ethyl vinyl alcohol or like barrier film may be substituted for foil. The sealing of the package with the marginal and end wall portions in the position shown and described is brought about by means of heat, which will fuse the thermoplastic layers with the sealing zone.

When the package is to be opened, the seal is torn open over one half of the sealing zone, whereupon the inwardly folded marginal portion located in said zone is pulled out to the position shown in FIG. 2, where the marginal and the end wall portions will form a pouring spout.

FIG. 3 shows part of a blank for a package of the indicated kind. The drawing shows essentially only that part of the blank which is to form the inside surface of the marginal and end wall portion of the package, which can be opened. The blank is provided with fold or score lines along which the blank is to be folded as to form the finished package.

Referring now to FIGS. 4 and 6, the carton illustrated is mainly of conventional construction. It includes opposed pairs of side walls 10 and 11, connected by a fifth panel 12. There is a bottom closure 13 and a gable top generally indicated at 14. The gable top includes a pair of side panels 15 having fold or score lines 16 to facilitate opening and a pair of end panels 17 having fold or score lines 18. A pair of top or side flaps 19 are extensions of side panels 15 and extend somewhat higher than end flaps 20 that are an extension of end panels 17. Side flaps 19 are heat sealed in face to face relationship as shown. Flaps 19 and 20 splay at horizontal fold line 27 to form the top of the carton. End flaps 20 are heat sealed to the interior of the lower parts of side flaps 19 as shown in FIG. 5.

Both in the case of hot fill and for non-shelf stable packed juices and dairy products flaps 19 and 20 are sealed over their entire surfaces. It is also known to provide further additional optional sealing such as a pair of vertical stake lines 21 at the end that is not to be opened and which coincides with the fifth panel 12. Optionally, at the other end there stake line 21a. There may also be a horizontal stake line 22 extending across the side flaps 19. Stake lines are strongly indented to give a more secure seal. There may also be a center stake point 70 which presses expands into abutment and seals the adjacent edges of the inwardly folded end flaps 20. The foregoing is conventional structure.

The present inventor has discovered that, in combination with an appropriate post-pasturization process, the said optional sealing areas are the truly critical ones. If these are made then it is not necessary to seal flaps 19 and 20 uniformly over their entire surfaces. Having realized this the present inventor empirically discovered what specific areas other than the critical areas should be sealed and the extent of such seal in order to achieve the desired easy opening characteristic in a shelf stable gable top carton.

Since sealing at the critical areas is sufficient to ensure that, in combination with the post-pasturization process selected, the seal will in a commercially acceptable percentage of cases keep bacteria out of the carton, the non-critical areas, i.e., the areas which are not staked, can be selectively sealed lightly or not at all to make the carton easy to open. One such construction is shown in FIGS. 4–6.

The difference from conventional structure according to this embodiment is in the area of the seal between side flap 19 and end flap 20. According to conventional practice in the case of hot fill, the whole of the interior of end flaps 20 are sealed to side flaps 19. According to this invention an area which may be in the shape of an inverted triangle or a notch or a sector is left unsealed or lightly sealed at the top center of end flap 20 as indicated by the numeral 25 in the broken away part of FIG. 5. The remaining sealed area is stippled and indicated at 24. In FIG. 6 the unsealed or lightly sealed area is shown at 23a and 23b which combine to provide area 23 when the carton is closed. It has been found that, particularly when the stake point 70 is located at the apex of triangle 25, an effective seal is provided in spite of this unsealed or lightly sealed area. The unsealed area at the top center enables the consumer to start opening the carton and also results in there being less seal to pull apart where the consumer has the least leverage.

Figure 7:
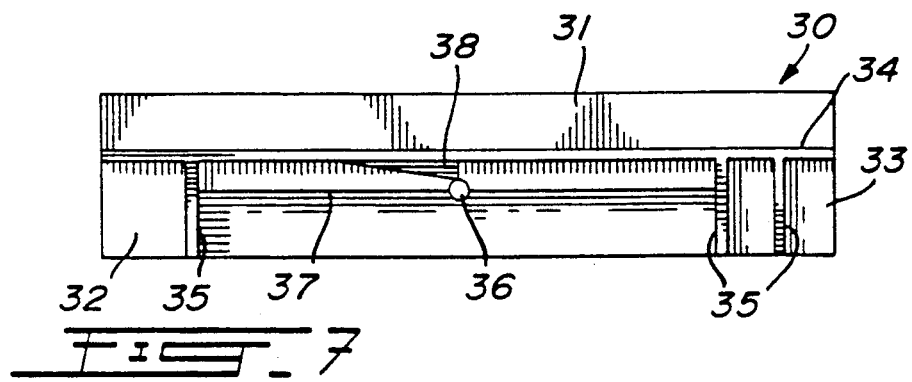
FIG. 7 is a view of a die used to seal the carton of FIGS. 4 and 5.

FIG. 7 illustrates the male jaw of a suitable die 30 including die face portion 31 for pressing together the upper part of side flaps 19, die face portions 32 and 33 for the ends and horizontal stake embossing line 34, vertical stake embossing lines 35 and embossing protrusion 36 for the center stake point. Die face portion 37 which presses flaps 19 and 20 together is cut away 38 to leave a triangular unsealed or lightly sealed area. This can be used with a matching female die.

Alternatives for providing the desired unsealed area would include the use of silicone as a parting agent or "abhesive" to prevent adhesion in area 25. Another possibility if adhesives were used in place of specifically made heat sealing jaws would be to omit adhesive in area 25. These methods are generally more expensive and less reliable because of the risk of misalignment of the parting agent to the desired non-adhering area. Thus, heat sealing with specially patterned jaws is the preferred method of closure where, as usual, the carton is coated internally with a thermoplastic resin.

Figure 8:
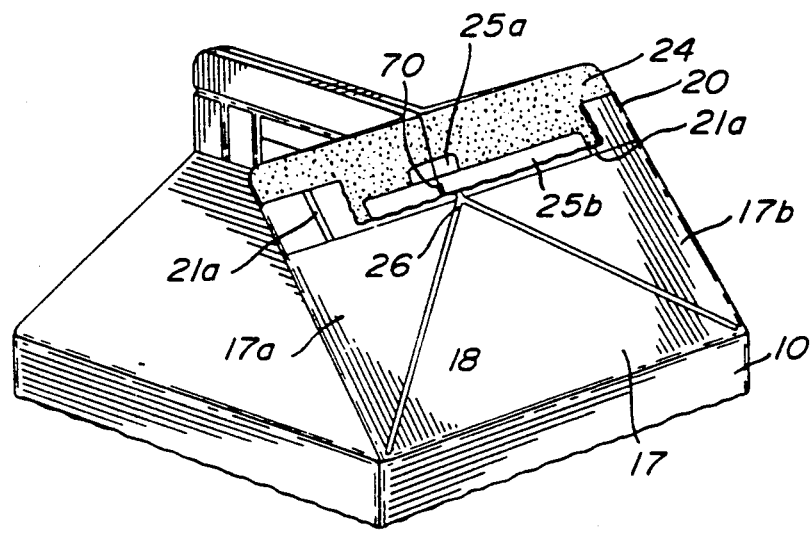
FIG. 8 is a perspective view of a gable top carton in accordance with another embodiment of this invention illustrating the opening of the carton.

FIG. 8 illustrates an improved structure which similar to that illustrated in FIGS. 4 to 6 but showing an unsealed or lightly sealed area at the top of flap 20 immediately above stake point 70 substantially in the shape of a rectangle 25a instead of the triangle of FIG. 5 and showing a further unsealed or lightly sealed area 25b extending between stake point 70 and vertical stake line 21a. Areas 25a and 25b are left unsealed or are lightly sealed by providing a die which applies no pressure or little pressure in these areas.

Figure 9:
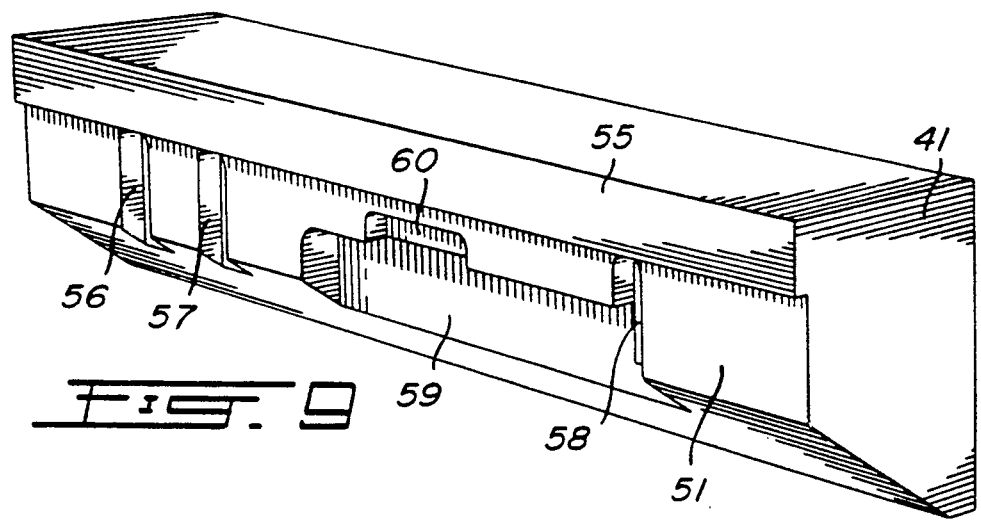
FIG. 9 is a perspective side elevation view of the female portion of a die for producing the embodiment of FIG. 8.
Figure 10:
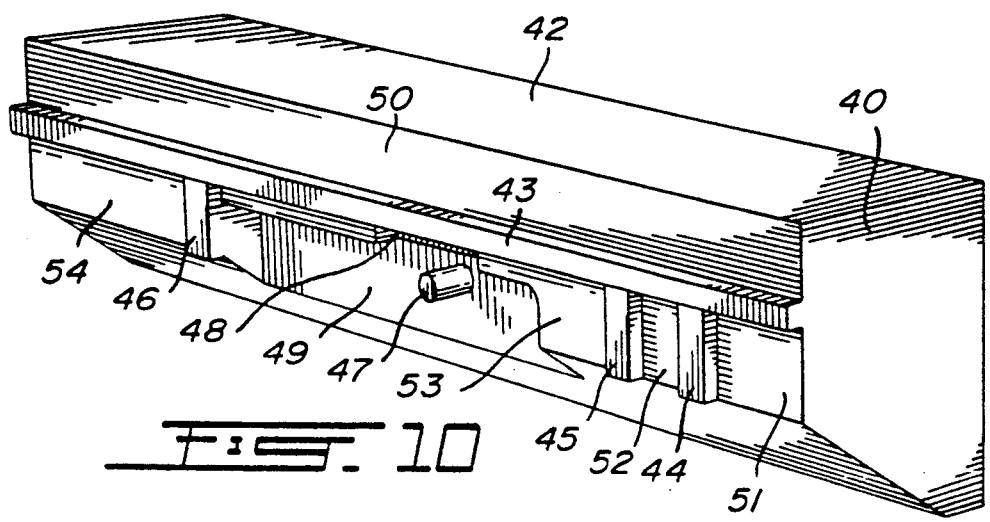
FIG. 10 is a perspective side elevation view of the male portion of a die for producing the embodiment of FIG. 8.

The construction of a suitable die is illustrated in FIG. 9 showing female jaw 41 and FIG. 10 showing male jaw 40. Referring now to FIG. 10, male jaw 40 has a die face 42 having a raised longitudinal rib 43 to provide a horizontal stake line and vertical ribs 44 and 45 to provide vertical stake lines on the side of the container that is to remain sealed and a vertical rib 46 to provide a vertical stake line on the spout end of the carton (i.e. the end that is to be opened). Male jaw 40 has a set screw 47 to provide a central stake point 70. The generally rectangular relieved area 25a of FIG. 8 is provided by depressed area 48 immediately above set screw 47 and offset in the direction of the side of the carton that is to be opened. A relieved area 49 is also provided extending from set screw 47, which provides center stake point 70, to rib 46 which provides vertical stake line 21a. Male jaw 40 also includes area 50 for sealing side flaps 19 of the carton and areas 51, 52, 53 and 54 for sealing the remainder of end flaps 20.

Female die 41 shown in FIG. 9 has an upper area 55 which mates with portion 50 of the male jaw and a slightly undercut area 51 the upper edge of which is located to accomodate rib 43. Die 41 has slots 56 and 57 to accomodate ribs 44 and 45 and slot 58 to accomodate rib 46. It also has a depressed area 59, to relieve pressure, matching area 49 of the male die and generally rectangular pressure relieving area 60 matching area 48 of the male die.

Figure 11:
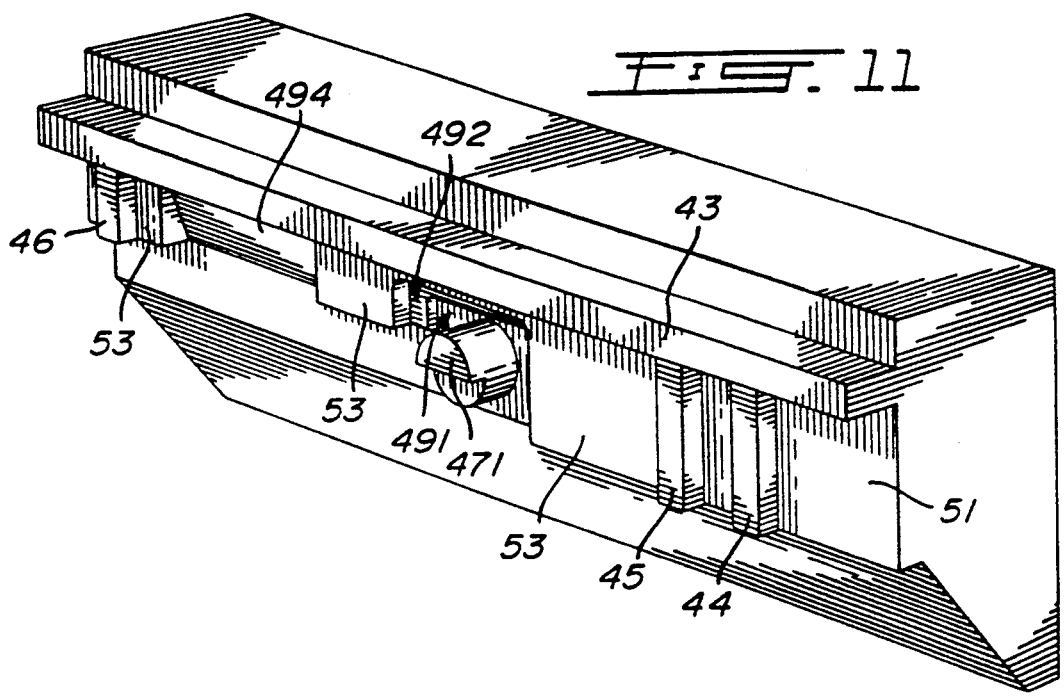
FIG. 11 is a perspective view of an improved male jaw for sealing a gable top carton.
Figure 12:
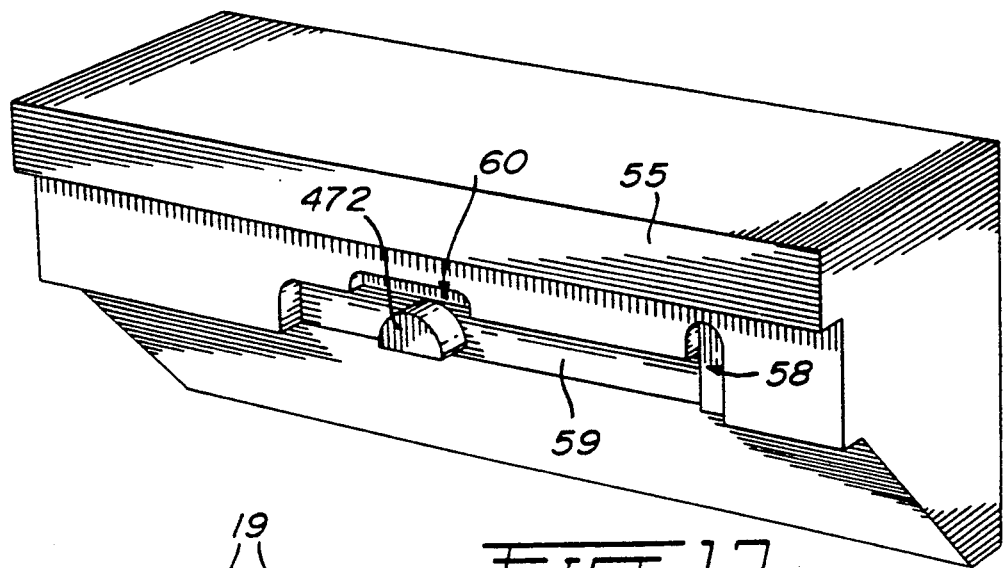
FIG. 12 is a perspective view of an improved female jaw for sealing a gable top carton.

FIGS. 11 and 12 show an even further improvement of the male and female jaws respectively. The jaw construction shown therein is similar to that shown in FIGS. 9 and 10 where similar reference numerals are used. However, there are several differences which have been empirically found to yield better results. The differences reside in the region below the longitudinal rib 43 and between rib 45 and rib 46. It should be noted that in all of FIGS. 9–12, the depth of the depressions relative to one another is exaggerated for emphasis. In FIG. 11, the set screw 47 used to define the stake point in the jaws shown in FIG. 10 is replaced with a protrusion 471 which may be of semi-circular shape as shown. The profusion 471 is in fact recessed from the longitudinal rib 43 but extends out generally as far as the ribs 44, 45 and 46. The male jaw also includes a recessed portion 53 like that of male jaw shown in FIG. 10, but the recessed portion 53 includes an inclined recess portion 494 recessed at an angle of about 30° to 40° with one edge contacting the recessed surface 53 and one edge extending significantly below that surface. Another surface 492 is recessed from the recess surface 53 and, optionally, a further recessed portion 491 is recessed from the portion 492.

The female jaws shown in FIG. 12 are similar to the female jaws shown in FIG. 8 with the exception of modification made in the depressed area 59. Specifically, in the modified jaw, the depressed area 59 is significantly depressed. From this depressed area are provided a number of areas which are less depressed, i.e., protrude from the depressed area 59. These include the areas 60 and 58 and a protruding area 472 which is adapted as a stake plate for protrusion 471 in the male jaw to provide a heavily staked area.

Figure 13:
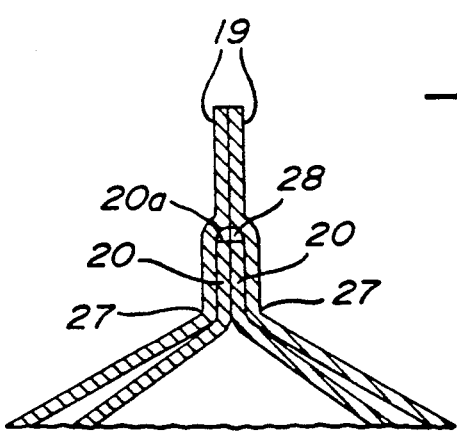
FIG. 13 is a cut-away view of a gable top carton.

A protrusion such as 36, 47 or 471 is necessary to create a center stake which will block the natural path bacteria might follow to enter the carton. This path would be from the edge of the carton along a channel 28 just above the upper edges 20a of end flaps 20 as shown in FIGS. 13 and 14 and down into the carton between the folding points of end flaps 20 where a natural gap 29 occurs. Accepted practice dictates that the larger the center stake in the gap region 29 the better.

The present inventor has discovered that to ensure the easy open characteristic desired the center stake should be optimally placed below and as close to the upper edge of the end flaps as possible with a shape and area sufficient to adequately close the gap 29 and no more such as shown at 71 in FIG. 14. The present inventor has further discovered that if this is done and area 26, being the intersection of the fold or score lines on panel 17, is left substantially unaffected by the center stake, this area will "pop" out during the opening process and greatly facilitate the opening of the carton. It is believed that this arrangement allows sub-panels 17a and 17b to toggle effectively without distortion and thus bring greater force to bear in breaking the seal.

Although the location and dimensions of the stake areas and the corresponding design of the jaws have been derived empirically, it has been found that generally the critical areas are those areas necessary to ensure a minimum complete seal of the flaps. Further, it has been found that, by relieving sealing pressure immediately adjacent to critical areas, improved sealing is achieved. Specifically, when the areas immediately adjacent the critical areas are relieved the force applied by the jaws to seal the flaps occurs at a reduced area, i.e. only at the critical areas. Accordingly, when a constant amount of pressure is applied to the jaw, the provision of a recessed area decreases the area of contact upon which high pressure is applied and thus increases the sealing pressure per unit of area over the critical areas; as a result, a stronger seal without an increase in pressure applied to the jaws.

Traditionally, gable top cartons were heat sealed evenly across the flaps by flat non-patterned planar jaws. The practice then developed to further strengthen the seal by adding horizontal and vertical stakes and a center stake. It is believed that until the present invention, it was not understood that, so long as a process could be developed which would not create any significant pressure differential across the seal, a practical seal could be achieved by relying principally on the sealing effect of the horizontal, vertical and center stakes. With this realization it became possible to relieve sealing pressure, and thus the bond strength between the flaps forming the seal, over those other areas which would significantly improve the opening characteristics of the carton.

The sealing of the gable top carton can be accomplished by employing the techniques described above so as to ensure a strong seal at certain critical areas while maintaining an easy to open carton. To ensure that this seal is adequate to ensure shelf stability, however, the contents must be sterilized or pasteurized in such a way that a stronger seal is not required and additional forces are not applied to the seal. As noted above, this means that the so-called hot fill method of pasteurization is not acceptable because it results in a vacuum which requires a stronger seal.

The present inventor has discovered that by combining the sealing technique described above with the following post-packaging pasturization process, traditional gable top cartons can be used to package sheland able liquid products and simultaneously retain their easy opening characteristic required in order to achieve consumer acceptance.

It is believed that no such practical process has previously been developed for post-packaging pasteurization in easy to open gable top cartons constructed of plastic or paperboard coated with plastic.

In accordance with one aspect of this invention, the method of providing liquid food products that are shelf stable in easy to open gable top cartons comprises the steps of:

(a) cold filling a plastic coated gable top carton with an essentially non-carbonated liquid food product free from pathogenic and thermophilic organisms;

(b) sealing the carton as described above;

(c) heating the food product in the carton to a pasteurization hold temperature in the range of about 160° F. and preferably 167° F. but below the softening temperature of the plastic;

(d) maintaining the food product at the pasteurization hold temperature for sufficient time to provide an adequate kill of the bacteria remaining within the carton; and (e) cooling.

The food products to which this invention is applicable are those which are generally pourable and could be advantageously packaged in gable top cartons, including, for example, liquid dairy products, non-carbonated fruit products such as the citrus products or citrus flavored products, fruit products, vegetables juices and vegetable cocktails. Carbonation must be a voided a s otherwise the pressures that would be generated in the carton during the process would be too high.

Another requirement of the food product is freedom from pathogenic and thermophilic bacteria. Most juices and drinks have pH's in the range 2.8–4.0 and not above pH 4.6. At a pH above 4.6 there is a potential problem of pathogenic bacteria. Below pH 4.6 the problems are yeast, molds and bacteria.

If the pH is above 4.6, which would include such products as milk, then there should be a preliminary ultra high temperature treatment at 240° F. to 260° F. for 15–20 seconds to kill pathogenic organisms, followed by cooling to ambient temperature. A preliminary ultra high temperature treatment is advisable with some vegetable base products such as tomato, due to their initial high content of thermophilic molds.

The juices and drinks to which this process is applicable are formulated in a tank at ambient temperatures in the range 40°–75° F. and pretreated as discussed above if necessary. They are then pumped to a filling station where the juice or drink is fed into cartons.

Although not essential, it may be useful to provide a sparging infusion valve in the line between the tank and filling station. The sparging infusion valve is used to add up to about 0.1 lbs/square inch of nitrogen or carbon dioxide, and preferably about 0.01 lbs/square inch. The purpose of sparging is to create a slight positive pressure to oppose the entrance of any bacteria into the carton after filling. Carbon dioxide is preferred for this purpose. The product sparged with carbon dioxide would have such a small amount of carbon dioxide that it would not be classified as a carbonated product.

At the filling station which is of conventional type, a number of individual cartons are filled cold. The temperature of the liquid food product should be less than 80° F. and desirably less than 70° F. to achieve a neutral or positive pressure after filling. This may be contrasted with hot fill temperatures of the order of 180° F. The maximum temperature that can be used depends on the conditions including the positive pressure from any sparging gas and on the strength of the seal. After filling and closing the cartons there should be a neutral to slightly positive pressure. As previously indicated a vacuum is undesirable.

The cold filled cartons are transferred to a processor comprising three zones, a preheat zone, a hold zone, and a cool zone.

The processor may be in the form of a continuously moving chain upon which rows of cartons are placed. The cartons are spaced to allow water to run down the sides of the cartons to heat or cool the contents. Heating may also be achieved in other ways such as the use of microwave energy provided no metal is used in the carton structure.

1. Preheat Zone

The cold filled cartons are preheated preferably by pouring water at a temperature of 180° F.–185° F. onto the cartons and allowing it to cascade down the sides. After a period of time that varies with the size of the carton, viscosity, solids content, etc., the liquid product within it reaches the desired "pasteurization hold" temperature. The preferred temperature for "pasteurization hold" is about 167° F., which will be reached in about 13-19 minutes in the case of 1 liter cartons. Two liter cartons would take 20 to 24 minutes to reach this temperature, while 4 to 7 minutes would be adequate for 250 ml. cartons. If microwave energy were used to heat the product, the time to reach the pasteurization temperature may be different.

2. Hold Zone

The product is maintained at the required pasteurization temperature for a predetermined time to ensure adequate kill of all microorganisms. The appropriate time at various "pasteurization hold" temperatures is available from standard texts. At the preferred temperature of 167° F. a hold time of ten minutes is recommended. The temperature should not be greater than about 174° F., at which the time will be about 4 minutes, as otherwise there may be problems with softening of the plastic where the carton is polyethylene and delamination of foil from paperboard will occur. Slightly higher temperature may be used with plastics having a higher softening point such as polypropylene. At lower temperatures the hold time is quite long. For example, at 160° F. it would be about 25 minutes.

3. Cool Zone

After holding for the required amount of time, the cartons go into a cooling zone which, if water chilled, may exit at around 90° F. to 105° F. This temperature is desirable as it will quickly evaporate off any excess moisture adhering to the carton.

The temperature of the cooling water may be about 35° F. to 60° F. The cartons then leave the processor and are packed in cases.

The process is further illustrated by the following examples:

EXAMPLE 1

This example relates to the production of 1000 Imperial gal. of single strength (ready to drink) orange juice. 135 gal. of orange juice concentrate 65 Brix (% soluble solids) is added to 865 gal. of water and blended for 10 minutes. It is then pumped using positive pumps through a line leading to a filler. The line includes a sparging infusion valve to sparge carbon dioxide to give an end product with about 0.1 lbs/square inch of gas. At the filler the carton is filled at a temperature of about 70° F. into one liter gable top cartons which are heat sealed in accordance with the sealing technique described above. The cartons are brought up to a temperature of 167° F. in 14 minutes and held at that temperature for 10 minutes. They are then chilled with water at 40° F. for 12 minutes to give an exit temperature of 90° F. The orange juice has a desirable shelf life of three months and a recommended maximum of six months. The taste of the orange juice is markedly better than that produced by hot filling.

EXAMPLE 2

This example relates to a Caesar's clam juice cocktail. A thousand imp. gal. batch was made of water and 100 imp. gal of tomato paste (32-34 brix) 650 lbs of salt; 60 lbs of monosodium glutamate; 700 lbs of glucose solids; 30 lbs of spices and 10 gal. of clam broth. It is pumped to a pasteurizer where the product is brought to a temperature of 250° F. in about 10-20 seconds, and held at this temperature to 48 to 52 seconds, cooled at 70° F. and then filled and processed as described in Example 1.

EXAMPLE 3

This example relates to the packaging of milk in a shelf stable easy to open gable top carton. The milk is first pasteurized at a conventional UHT temperature such as 250° F. for approximately 8 seconds then immediately cooled to ambient temperature. The milk is then cold filled into gable top cartons in the normal manner under stringent sanitary conditions and then sealed and processed as described in Example 1.

I claim:

1. A die for sealing a heat sealable carton having a gable shaped closure, said gable shaped closure including side flaps extending from opposed side panels and end flaps extending from opposed end panels to a lower height than the flaps of the side panels, the end flaps having adjacent portions when inwardly folded to provide said closure, and at least one end panel having fold lines to facilitate opening and closing one end of the carton, the die including a pair of jaws, each of the jaws having an upper surface for pressing together the portions of the side flaps that are above the end flaps, said jaws having lower surfaces for pressing together the side flaps and folded end flaps, a recessed area in at least one of said lower surfaces, and one of said dies having a protrusion immediately below said recessed area to provide a center stake point which presses together and seals a region of the carton comprising said adjacent edges of the inwardly folded end flaps, and wherein the recessed area provides an area at the center of the upper portion of said end flaps that is not as firmly sealed as the area of the center stake so as to facilitate opening of the carton.

2. A die as in claim 1, in which a linear horizontal rib is provided in one of said jaws at the junction between the upper surfaces and the lower surfaces, acting in cooperation with the other of said jaws to provide a horizontal stake line just above the upper edges of the end flaps.

3. A die as in claim 2, comprising two on one of said jaws vertical ribs extending downwardly from said horizontal rib to provide vertical stake lines adjacent to each end of the side flaps.

4. A die as in claim 3 comprising in one of said jaws a second recessed area in the lower surface extending from the area of the protrusion outwardly toward the end of the jaw corresponding to the spout end of the carton to a point proximate one of the vertical ribs.

5. A die as in claim 4 comprising a third recessed area centered approximately two thirds of the way between the protrusion and the vertical rib on the spout end of the carton said third recessed area being progressively recessed from the plane of the second recessed area commencing at the horizontal rib.

6. A die as in claim 3, in which there is an additional recessed area below said recess and extending between one of said vertical ribs and the center of the die.

7. A die as in claim 1 wherein said protrusion has a semi-circular shape in the plane of the jaw from which it protrudes.

8. A die as in claim 1 wherein the protrusion is located to provide a center stake point immediately below the upper edge of the end flaps.

9. A die as in claim 1 for sealing a carton having inwardly folded end flaps that have a lower edge that is defined by a horizontal fold line, wherein the protrusion is located to provide a center stake point above a point mid-way between the upper edge of the end flaps and the horizontal fold line.

10. A pair of jaws for sealing a heat sealable carton having a gable shaped closure, said gable shaped closure including side flaps extending from opposed side panels and end flaps extending from opposed end panels to a lower height than the flaps of the side panels, the end flaps having adjacent portions when inwardly folded to provide said closure, and at least one end panel having fold lines to facilitate opening and closing one end of the carton, said jaws comprising:

an upper surface on each of said jaws for pressing together the portions of the side flaps that are above the end flaps;

lower surfaces on each of said jaws for pressing together the side flaps and folded end flaps, and a first recessed area in at least one of said lower surfaces;

a protrusion immediately below said recessed area on one of said jaws to provide a center stake point which presses together and seals a region of the carton overlying the adjacent edges of the inwardly folded end flaps; and wherein the recessed area provides an area at the upper portion of said end flaps that is not as firmly sealed as the are of the center stake so as to facilitate opening of the carton.

11. A pair of jaws as in claim 10, in which a linear horizontal rib is provided in one of said jaws at the junction between the upper surfaces and the lower surfaces, acting in cooperation with the other of said jaws to provide a horizontal stake line just above the upper edges of the end flaps.

12. A pair of jaws as in claim 11, comprising at least one vertical rib on one of said jaws that extends downwardly from said horizontal rib to provide at least one vertical stake line adjacent to at least that end of the side flaps opposite the portion of the side flaps and the end flaps that form the spout.

13. A pair of jaws as in claim 12 comprising in one of said jaws a second recessed area in the lower surface extending from the area of the protrusion outwardly toward the end of the jaw corresponding to the spout end of the carton to a point proximate one of the vertical ribs.

14. A pair of jaws as in claim 11 comprising a recessed area that is progressively recessed from the horizontal rib.

15. A pair of jaws as in claim 10, in which there is an additional recessed area below said first recess and extending between the at least one vertical rib and the center of the jaws.

16. A pair of jaws as in claim 10 wherein said protrusion has a semi-circular shape.

17. A pair of jaws as in claim 10 wherein the protrusion is located to provide a center stake point immediately below the upper edge of the end flaps.

18. A pair of jaws as in claim 10 for sealing a carton having inwardly folded end flaps that have a lower edge that is defined by a horizontal fold line, wherein the protrusion is located to provide a center stake point above a point mid-way between the upper edge of the end flaps and the horizontal fold line.

* * * * *

UNITED STATES PATENT AND TRADEMARK OFFICE
CERTIFICATE OF CORRECTION

PATENT NO. : 5,321,930
DATED : June 21, 1994
INVENTOR(S) : Donald A. Poole

It is certified that error appears in the above-indentified patent and that said Letters Patent is hereby corrected as shown below:

| Column | Line | |
|--------|------|---|
| 1  | 6  | Change "Aug. 8" to --Aug. 18--. |
| 4  | 51 | Change "a septic" to --aseptic--. |
| 8  | 10 | Change "and" to --the--. |
| 9  | 12 | After "there" insert --is--. |
| 9  | 16 | After "presses" insert --together,--. |
| 9  | 62 | After "away" insert --at--. |
| 10 | 8  | After "which" insert --is--. |
| 12 | 15 | Change "sheland able" to --shelf stable--. |
| 12 | 47 | Change "a voided a s" to --avoided as--. |
| 16 | 14 | Change "are" to --area--. |

Signed and Sealed this

Twentieth Day of December, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,321,930
DATED : June 21, 1994
INVENTOR(S) : Donald A. Poole

It is certified that error appears in the above-indentified patent and that said Letters Patent is hereby corrected as shown below:

| Column | Line | |
|--------|------|---|
| 10 | 41 | Change "accomodate" to --accommodate--. |
| 10 | 42 | Change "accomodate" to --accommodate-- (both occurrences). |
| 15 | 12 | After "comprising" delete "two". |
| 15 | 13 | After "jaws" insert --two--. |
| 15 | 24 | After "carton" insert --,--. |

Signed and Sealed this

Fourteenth Day of February, 1995

Attest:

BRUCE LEHMAN

Attesting Officer

Commissioner of Patents and Trademarks